US008117449B2

(12) United States Patent
Blythe

(10) Patent No.: US 8,117,449 B2
(45) Date of Patent: Feb. 14, 2012

(54) METHOD TO DETECT MAN-IN-THE-MIDDLE (MITM) OR RELAY ATTACKS

(75) Inventor: Simon Blythe, Ely (GB)

(73) Assignee: MasterCard International, Inc., Purchase, NY (US)

( * ) Notice: Subject to any disclaimer, the term of this patent is extended or adjusted under 35 U.S.C. 154(b) by 1020 days.

(21) Appl. No.: 12/005,576

(22) Filed: Dec. 27, 2007

(65) Prior Publication Data

US 2009/0168997 A1    Jul. 2, 2009

(51) Int. Cl.
*H04L 9/32* (2006.01)
(52) U.S. Cl. ........ 713/169; 713/172; 713/170; 713/502; 726/9; 726/20; 726/22; 726/23; 380/34
(58) Field of Classification Search .......... 380/34, 380/28, 268; 713/168, 169, 170, 172, 502; 726/22–25, 9, 20
See application file for complete search history.

(56) References Cited

U.S. PATENT DOCUMENTS

| | | | | |
|---|---|---|---|---|
| 5,239,641 A | * | 8/1993 | Horst | 713/375 |
| 5,353,436 A | * | 10/1994 | Horst | 713/375 |
| 5,444,780 A | | 8/1995 | Hartman, Jr. | |
| 5,960,100 A | | 9/1999 | Hargrove | |
| 6,088,450 A | * | 7/2000 | Davis et al. | 713/182 |
| 6,222,924 B1 | | 4/2001 | Salomaki | |
| 6,278,780 B1 | * | 8/2001 | Shimada | 380/47 |
| 6,325,285 B1 | * | 12/2001 | Baratelli | 235/380 |
| 6,351,813 B1 | * | 2/2002 | Mooney et al. | 713/185 |
| 6,594,361 B1 | | 7/2003 | Chaney et al. | |
| 6,717,915 B1 | * | 4/2004 | Liao et al. | 370/252 |
| 6,992,568 B2 | * | 1/2006 | Perraud et al. | 340/10.3 |
| 7,069,438 B2 | | 6/2006 | Balabine et al. | |
| 7,155,416 B2 | | 12/2006 | Shatford | |
| 7,178,041 B2 | | 2/2007 | Asokan et al. | |
| 7,206,847 B1 | | 4/2007 | Alberth, Jr. et al. | |
| 7,231,526 B2 | * | 6/2007 | Hon et al. | 713/185 |
| 7,260,727 B2 | | 8/2007 | Fougeroux et al. | |
| 7,296,162 B2 | * | 11/2007 | Wajs | 713/178 |
| 7,314,169 B1 | * | 1/2008 | Jasper et al. | 235/382 |
| 7,798,394 B2 | * | 9/2010 | Hill et al. | 235/375 |
| 2002/0083175 A1 | * | 6/2002 | Afek et al. | 709/225 |
| 2003/0065918 A1 | * | 4/2003 | Willey | 713/168 |
| 2003/0184431 A1 | * | 10/2003 | Lundkvist | 340/5.2 |
| 2006/0294362 A1 | * | 12/2006 | Epstein | 713/153 |
| 2007/0118483 A1 | * | 5/2007 | Hill et al. | 705/64 |
| 2007/0198432 A1 | * | 8/2007 | Pitroda et al. | 705/64 |

* cited by examiner

*Primary Examiner* — David Garcia Cervetti
(74) *Attorney, Agent, or Firm* — Hoffmann & Baron, LLP

(57) ABSTRACT

A method for detecting a communication relay attack involves the steps of counting a number of clock cycles occurring in a clock signal between transmission of two predetermined elements of data with a data transmission device, counting a number of clock cycles occurring in the clock signal between receipt of the two predefined elements of data and comparing the number of clock cycles counted by the data transmission device with the number of clock cycles counted by the data receiving device.

19 Claims, 2 Drawing Sheets

METHOD TO DETECT MAN-IN-THE-MIDDLE (MITM) OR RELAY ATTACKS

BACKGROUND OF THE INVENTION

The present invention relates to wireless devices and methods for providing secure data transmission with such devices.

Wireless payment devices, such as smart cards, mobile phones and personal digital assistants (PDAs) have become increasingly common for everyday purchases of goods and services. In use, such devices are typically waved or otherwise placed in close proximity to a merchant's payment terminal so that a wireless communication can occur between the device and the terminal to authorize a payment transaction.

"Smart cards," as they are known, physically resemble credit cards but are far more powerful in that they have one or more signal processing integrated circuits (ICs) or microcontrollers embedded in their plastic which manage access to, and storage of, sensitive data that is actually stored in memory devices on the smart card. Data that might be stored in a smart card includes bank account numbers, personal data, or the electronic equivalent of currency.

A typical smart card may have six IC contacts positioned on the card surface. In some embodiments, six of the eight signals at the contact points are defined as VCC (supply voltage), RST (reset signal), CLK (clock signal), GND (ground), VPP (programming voltage for programming memory in the card IC), and I/O (serial data input/output). In other embodiments, the VPP contact is not used.

The IC in a smart card processes data such as security control information as part of an access control protocol. The processor further performs various security control functions including entitlement management and generating the key for descrambling the scrambled data component of the signal.

Despite such security controls, communications between such handheld payment devices and payment terminals are vulnerable to attacks by an intervener, known in the art as a man-in-the-middle (MITM). Some attacks on communication systems involve the interception of a communication between two or more intended parties by a MITM with subsequent modification of the content of the communication. Defenses to such attacks typically involve many well-established cryptographic techniques and protocols to protect the communication.

Other attacks, known as relay attacks, allow a MITM to impersonate a participant during an authentication protocol by effectively extending the intended transmission range for which the system was designed. For example, a relay attack occurs when an innocent purchaser presents a smart card to authorize a payment transaction at a first location and the authorization is sent to a MITM at a second unintended location where it is accepted as a valid authorization by the MITM. In this manner, the MITM can purchase goods using the innocent purchaser's smart card authorization provided at a remote location.

Accordingly, it would be desirable to provide a method to prevent or at least hinder such exploitative interception and relay of wireless communications with respect to payment transactions.

SUMMARY OF THE INVENTION

The present invention involves a method for detecting a communication relay attack. The method generally includes the steps of establishing a communication link between a data transmitting device and a data receiving device, transmitting a clock signal from the data receiving device to the data transmitting device for synchronizing data communication between the data transmitting device and the data receiving device, transmitting data from the data transmitting device to the data receiving device, wherein the data has a first predefined element and a second predefined element, counting a number of clock cycles occurring in the clock signal between transmission of the first predetermined element of the data and transmission of the second predefined element of the data with the data transmission device, counting a number of clock cycles occurring in the clock signal between receipt of the first predefined element of the data and receipt of the second predefined element of the data with the data receiving device and comparing the number of clock cycles counted by the data transmission device with the number of clock cycles counted by the data receiving device.

The method further preferably includes the steps of enciphering the number of clock cycles counted and sending the enciphered clock count as part of the data stream. The number of clock cycles can be enciphered and sent by the data receiving device to the data transmitting device for comparison by the data transmitting device, or vise versa.

The data transmitting device can be a smart card, a mobile phone or a personal digital assistant (PDA) and the data receiving device can be a merchant's payment terminal, wherein the communication link is wireless. Also, the first and second predefined elements of the data are preferably encrypted and include respective instructions for the data receiving device to start and stop counting the clock cycles. The first and second predefined elements can be uniquely defined by the data transmitting device upon establishing the communication link, or they can be preset before establishing the link.

The present invention further involves a system for detecting a communication relay attack. The system generally includes a data transmitting device, such as a smart card, for transmitting data having a first predefined element and a second predefined element and a data receiving device, such as a payment terminal, for receiving the transmitted data from the data transmitting device. The data receiving device further includes a clock for transmitting a clock signal to the data transmitting device and a clock counter for counting a number of clock cycles occurring in the clock signal between receipt of the first predefined element of the data and receipt of the second predefined element of the data. The data transmitting device also includes a clock counter for counting a number of clock cycles occurring in the clock signal between transmission of the first predefined element of the data and the second predefined element of the data. At least one of the data transmitting device and the data receiving device further includes a comparator for comparing the number of clock cycles counted by the data transmitting device with a number of clock cycles counted by the data receiving device.

Thus, the number of clock cycles between predefined elements in a communication stream is separately counted by the real participants involved in a transaction. The number of clock cycles counted by one of the participants is then enciphered as part of the message exchange and sent to the other participant for comparison with the actual count obtained by the second participant. If there are only two participants to the transaction, they will share a single clock and the number of clock cycles computed should tally. If there is a third participant, more than one clock will be involved in the transaction and the counts will differ by at least one cycle between the predefined message elements. Thus, either party can assume that a MITM relay attack has occurred. This would be the case, for example, if the MITM generates a local clock remotely to attempt to fool the unintended remote party that it is involved in an intended communication.

A preferred form of the method to detect communication relay attacks, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENTS

Most communications between wireless payment devices such as proximity cards or smart cards, mobile phones, and personal digital assistants (PDAs) involve the transmission of encrypted or enciphered data over a secure channel. Most communications between such parties further use an unsecured, second channel to share a timebase signal or "clock." For example, in the case of a smart card, there will be an actual clock signal that is transmitted between the card and the payment terminal, which drives the communication process inside the card and synchronizes the activity of the process of the computer chip in the card. Thus, in some cases, the time signal synchronizes the communication between the smart card chip and the terminal by setting the speed of the communication.

The method according to the present invention makes use of this shared clock signal to limit the possibilities for successful relay to unintended remote third parties. This is possible in part due to the fact that, while a MITM may use communication equipment to intercept and relay a data message being transmitted over the secure channel, in sufficiently high-frequency communications it is very difficult to regenerate the clock signal with sufficient fidelity to defeat the proposed mechanism of the present invention.

Figure 1:
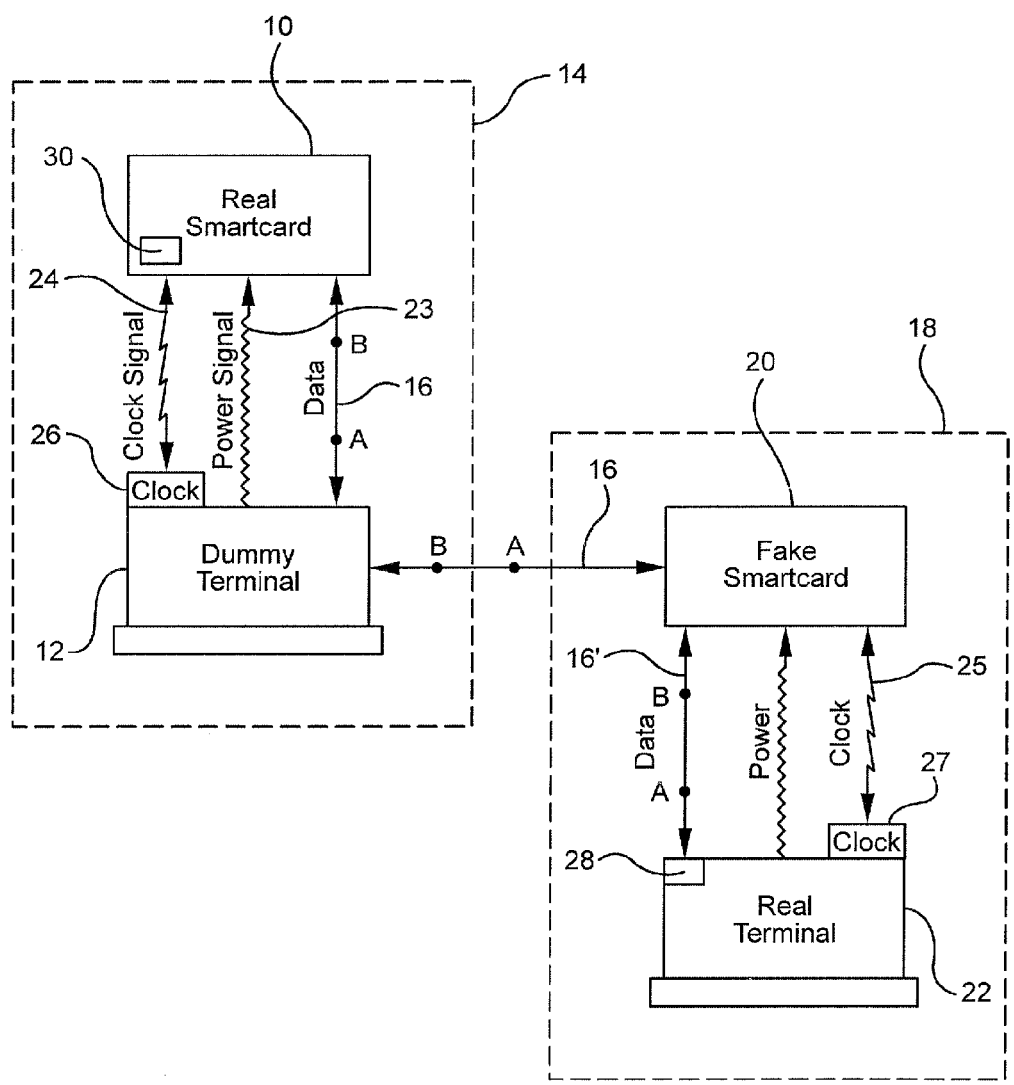
FIG. 1 is a diagrammatic view of an exemplary relay attack communication scheme wherein the method according to the present invention is implemented to detect such an attack.

In an exemplary communication relay attack scheme, as shown in FIG. 1, a user presents a data transmitting device, such as a smart card 10, to a data receiving device, such as a merchant's payment terminal 12, to authorize a particular transaction, such as payment for goods or services at a first location 14. In some relay attack scenarios, the merchant's terminal 12 has been tampered with by a MITM and is therefore termed a "dummy terminal." The dummy terminal 12 looks and acts in all respects like an authentic payment device, but instead of communicating with a bank that issued the smart card, the dummy terminal is adapted to relay the data transmission 16 from the smart card 10 to a second location 18.

Thus, like a real terminal, the dummy terminal 12 is adapted to transmit a power signal 23 and a clock signal 24 to the real smart card 10 to enable communication therebetween. However, unbeknownst to the user of the real smart card 10, the data transmission 16 is relayed to a fake smart card 20 at the second location 18. The MITM presents the fake smart card 20 to a real payment terminal 22 at the second location 18 in order to authorize a particular transaction. Believing it is communicating with the real smart card 10, the real terminal 22 accepts the authorization and allows the payment transaction.

To detect such relay attacks, the method according to the present invention determines if more than one terminal is involved in a transaction by detecting the presence of more than one clock. Specifically, the method according to the present invention involves counting of clock signals at two locations and comparing the counts to determine if more than one clock is involved in the transaction. If a relay attack has occurred, the clock counts will invariably differ. This is due to the fact that no two clocks are the same as a result of manufacturing tolerances and inconsistencies. Thus, in the case of a relay attack, where two clocks are present, the clocks will always cycle at different rates making the detection of a second clock in the transaction possible. Obviously, if only one clock is present, the counts obtained by the real smart card 10 and the real terminal 22 will match. This will indicate that no attack has occurred.

Figure 2:
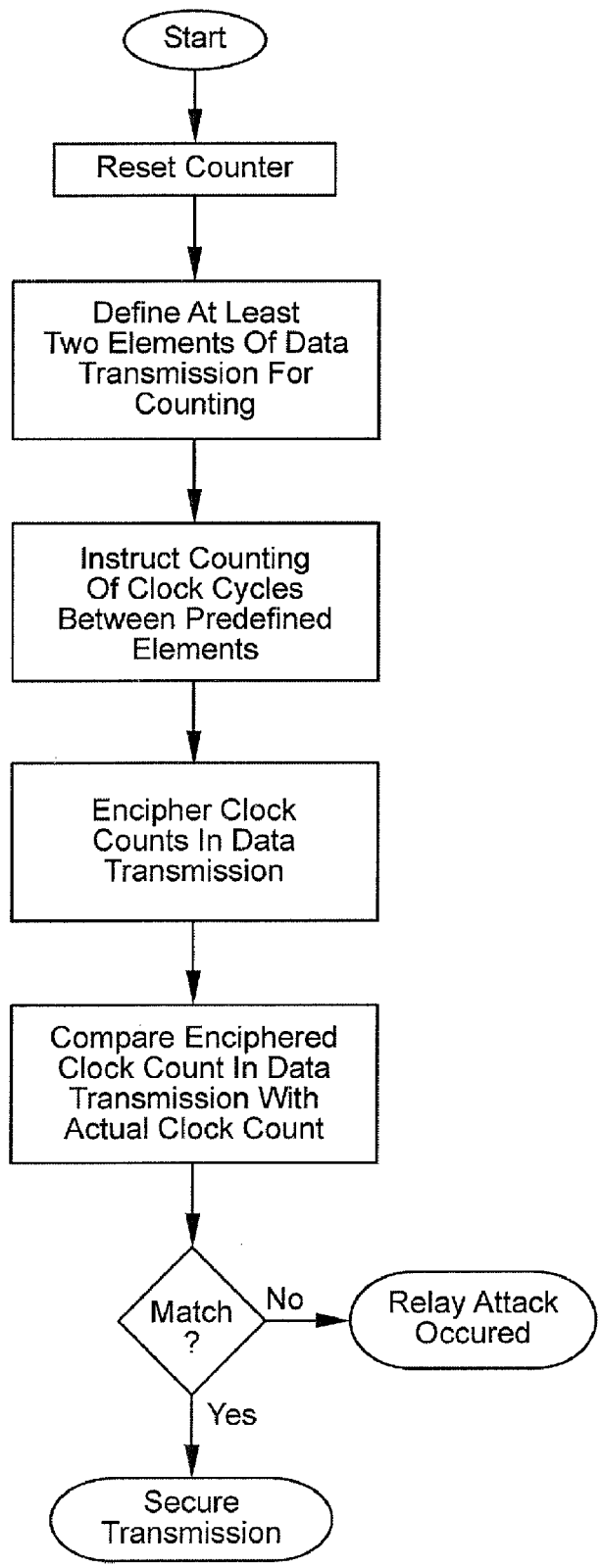
FIG. 2 is a flow chart showing the method steps of the present invention.

Referring additionally to FIG. 2, to initiate a transaction with a payment device 12, the real smart card 10 is presented to the device and the device transmits a power signal 23 and a clock signal 24 to enable communication between the smart card and the payment device. The real smart card 10 transmits a data stream 16, which includes an instruction for the payment device 12 to reset its counter. Such instruction may be encrypted within the data stream 16. Because the dummy terminal 12 typically will not have a counter, such instruction will be sent to the real terminal 22, where a counter 28 of the real terminal will reset.

The real smart card 10 will then transmit data 16 having at least two defined elements or events A, B cryptographically embedded therein. Such elements A, B can be uniquely defined by the smart card 10 each time the smart card is presented, or can be preset in the smart card prior to use. The first element A includes an encrypted instruction for a counter to begin counting clock cycles and the second element B includes an instruction to stop counting clock cycles.

The dummy terminal 12 is generally oblivious to the two defined elements or events A, B and simply relays the data stream 16 to the fake smart card 20, which in turn relays the data to the real terminal 22. However, upon receiving the first element A, the counter 28 of the real payment device 22 is instructed to begin counting clock cycles of the clock signal 25 it is transmitting to the fake smart card 20. Upon receiving the second predefined element B, the counter 28 of the real payment device 22 is instructed to stop counting clock cycles and store the value representing the number of cycles counted.

Simultaneously, upon transmitting element A, the real smart card 10 begins counting clock cycles in the signal 24 it is receiving from the clock 26 of the dummy terminal. Once the real smart card 10 transmits element B, the real smart card stops counting and stores its own count, which is compared with the count obtained by the real terminal 22.

Such comparison can be done by enciphering the value representing the number of clock cycles counted and incorporating the enciphered count into the data stream 16 transmitted between the real smart card 10 and the real terminal 22. In other words, the real terminal 22 can encipher its clock count and send the count as part of the data stream 16 back to the real smart card 10. In this regard, the real smart card 10 will include a comparator 30 which compares the enciphered value it receives from the real terminal 22 with the actual count it has obtained. Alternatively, the real smart card 10 can encipher its clock count and send the count as part of the data stream 16 back to the real payment device 22, where it is compared with the actual count obtained by the real payment device.

In either case, if the clock counts differ, it can be concluded that a relay attack has occurred and the transaction can be stopped or otherwise voided. If the clock counts match, it can be concluded that only one clock is present and, therefore, no attack has occurred. In this case, the transaction can proceed or be otherwise authorized.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A method for detecting a communication relay attack comprising the steps of:
    establishing a communication link between a wireless payment device and a data receiving device;
    transmitting a clock signal from said data receiving device to said wireless payment device for synchronizing data communication between said wireless payment device and said data receiving device;
    transmitting data from said wireless payment device to said data receiving device, said data having a first predefined element and a second predefined element;
    counting a number of clock cycles occurring in said clock signal between transmission of said first predetermined element of said data and transmission of said second predefined element of said data with said wireless payment device;
    counting a number of clock cycles occurring in said clock signal between receipt of said first predefined element of said data and receipt of said second predefined element of said data with said data receiving device;
    comparing said number of clock cycles counted by said wireless payment device with said number of clock cycles counted by said data receiving device; and
    determining that a communication relay attack has occurred if said number of clock cycles counted by said wireless payment device differs from said number of clock cycles counted by said data receiving device,
    wherein said first predefined element of said data includes an instruction for said data receiving device to start counting said clock cycles and said second predefined element of said data includes an instruction for said data receiving device to stop counting said clock cycles.

2. The method as defined in claim 1, wherein said wireless payment device is a smart card.

3. The method as defined in claim 1, wherein said wireless payment device is a mobile phone.

4. The method as defined in claim 1, wherein said wireless payment device is a personal digital assistant (PDA).

5. The method as defined in claim 1, wherein said communication link is wireless.

6. The method as defined in claim 1, wherein said data receiving device is a payment terminal.

7. The method as defined in claim 1, further comprising the steps of:
    enciphering said number of clock cycles counted by said data receiving device; and
    transmitting said enciphered number to said wireless payment device, wherein said wireless payment device compares said received enciphered number with said number of clock cycles counted by said data receiving device.

8. The method as defined in claim 1, further comprising the steps of:
    enciphering said number of clock cycles counted by said wireless payment device; and
    transmitting said enciphered number to said data receiving device, wherein said data receiving device compares said received enciphered number with said number of clock cycles counted by said wireless payment device.

9. The method as defined in claim 1, wherein said first and second predefined elements of said data are encrypted.

10. The method as defined in claim 1, wherein said clock signal and said data are transmitted over separate channels.

11. The method as defined in claim 1, wherein said first and second predefined elements are uniquely defined by said wireless payment device upon establishing said communication link.

12. The method as defined in claim 1, wherein said first and second predefined elements are preset before establishing said communication link.

13. The method as defined in claim 1, wherein said transmitted data includes an instruction for the data receiving device to reset a counter thereof.

14. A system for detecting a communication relay attack comprising:
    a wireless payment device for transmitting data having a first predefined element and a second predefined element, said wireless payment device including a clock counter for counting a number of clock cycles occurring in a clock signal between transmission of said first predefined element of said data and said second predefined element of said data; and
    a data receiving device for receiving said data from said wireless payment device and including a clock for transmitting a clock signal to said wireless payment device and a clock counter for counting a number of clock cycles occurring in said clock signal between receipt of said first predefined element of said data and receipt of said second predefined element of said data,
    wherein at least one of said wireless payment device and said data receiving device further includes a comparator for comparing a number of clock cycles counted by said wireless payment device with a number of clock cycles counted by said data receiving device, said comparator further determining that a communication relay attack has occurred if said number of clock cycles counted by said wireless payment device differs from said number of clock cycles counted by said data receiving device, and
    wherein said first predefined element of said data includes an instruction for said data receiving device to start counting said clock cycles and said second predefined element of said data includes an instruction for said data receiving device to stop counting said clock cycles.

15. The system as defined in claim 14, wherein said wireless payment device data transmitting device is a smart card.

16. The system as defined in claim 14, wherein said wireless payment device is a mobile phone.

17. The system as defined in claim 14, wherein said wireless payment device is a personal digital assistant (PDA).

18. The system as defined in claim 14, wherein said wireless payment device and said data receiving device are adapted for wireless communication therebetween.

19. The system as defined in claim 14, wherein said data receiving device is a payment terminal.

* * * * *